United States Patent
Raedler et al.

(10) Patent No.: US 11,667,413 B2
(45) Date of Patent: Jun. 6, 2023

(54) DEEP-DRAWING PACKAGING MACHINE WITH IMPULSE SEALING BARS AND IMPULSE SEALING METHOD

(71) Applicant: MULTIVAC SEPP HAGGENMUELLER SE & CO. KG, Wolfertschwenden (DE)

(72) Inventors: Michael Raedler, Kempten (DE); Bastian Grondinger, Biessenhofen (DE); Florian Felch, Durach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 17/709,526

(22) Filed: Mar. 31, 2022

(65) Prior Publication Data
US 2022/0324595 A1   Oct. 13, 2022

(30) Foreign Application Priority Data

Mar. 31, 2021   (DE) .................... 10 2021 108 126.2

(51) Int. Cl.
*B65B 7/16*   (2006.01)
*B65B 43/08*   (2006.01)
(Continued)

(52) U.S. Cl.
CPC ............. *B65B 7/164* (2013.01); *B65B 43/08* (2013.01); *B65B 51/10* (2013.01); *B65B 61/06* (2013.01)

(58) Field of Classification Search
CPC ......... B65B 7/164; B65B 43/08; B65B 51/10; B65B 61/06; B65B 9/02; B29C 65/22–38
(Continued)

(56) References Cited

U.S. PATENT DOCUMENTS

| 4,169,344 A | 10/1979 | Ganz et al. |
| 5,096,052 A * | 3/1992 | Raque ................... B65B 51/225 198/803.15 |

(Continued)

FOREIGN PATENT DOCUMENTS

| DE | 197 37 471 C2 | 3/2002 |
| DE | 198 15 763 C2 | 5/2002 |

(Continued)

OTHER PUBLICATIONS

German Search Report dated Nov. 29, 2021, Application No. 10 2021 108 126.2, Applicant MULTIVAC Sepp Haggenmueller SE & Co. KG, 5 Pages.

(Continued)

*Primary Examiner* — Dariush Seif
(74) *Attorney, Agent, or Firm* — Brooks Kushman P.C.

(57) ABSTRACT

The disclosure relates to a deep-drawing packaging machine comprising, in a direction of production, a forming station for producing trays in a film web, a loading stretch for filling the trays with a product, a sealing device for sealing the trays with a top film, as well as a cutting device for separating finished packagings. The sealing device comprises a first sealing tool for a first sealing cycle and a second sealing tool for a second sealing cycle. The first sealing tool comprises at least one first pair of impulse sealing bars oriented in a first orientation relative to the direction of production for producing first sealing seam sections, and the second sealing tool comprises at least one second pair of impulse sealing bars oriented in a second orientation relative to the direction of production for producing second sealing seam sections.

10 Claims, 2 Drawing Sheets

(51) Int. Cl.
  *B65B 51/10* (2006.01)
  *B65B 61/06* (2006.01)
(58) Field of Classification Search
  USPC .......................................................... 53/512
  See application file for complete search history.

(56) References Cited

U.S. PATENT DOCUMENTS

| | | | | |
|---|---|---|---|---|
| 5,345,747 | A * | 9/1994 | Raque ............... | B29C 66/24244 53/374.4 |
| 5,976,299 | A * | 11/1999 | Ivey ................. | B29C 66/91421 493/239 |
| 2003/0185937 | A1 * | 10/2003 | Garwood ............ | A22B 5/0029 426/35 |
| 2004/0016205 | A1 * | 1/2004 | Douglas ............... | B65B 61/188 53/133.4 |
| 2013/0000837 | A1 * | 1/2013 | Kim .................... | B29C 66/1122 156/60 |
| 2017/0057671 | A1 * | 3/2017 | van Wandelen ......... | B26D 9/00 |
| 2018/0272019 | A1 * | 9/2018 | Roberts .................. | B65B 7/164 |
| 2019/0016487 | A1 * | 1/2019 | Capitani ............. | B29C 66/8322 |
| 2022/0274727 | A1 * | 9/2022 | Last .................. | B29C 66/83533 |
| 2022/0324595 | A1 * | 10/2022 | Raedler ............. | B29C 66/24244 |
| 2022/0379573 | A1 * | 12/2022 | Hildebrand ....... | B29C 66/81431 |
| 2023/0021787 | A1 * | 1/2023 | Patz ..................... | B65B 43/305 |

FOREIGN PATENT DOCUMENTS

| | | |
|---|---|---|
| DE | 10 2012 007 594 A1 | 10/2013 |
| DE | 10 2012 007 598 A1 | 10/2013 |
| DE | 10 2019 214 968 A1 | 4/2021 |
| EP | 2 505 340 A1 | 10/2012 |

OTHER PUBLICATIONS

European Search Report (with English Machine Translation) dated Sep. 8, 2022, Application No. 22158977.3-1014, Applicant MULTIVAC Sepp Haggenmueller SE & Co. KG, 12 Pages.

* cited by examiner

DEEP-DRAWING PACKAGING MACHINE WITH IMPULSE SEALING BARS AND IMPULSE SEALING METHOD

CROSS-REFERENCE TO RELATED APPLICATIONS

This application claims foreign priority benefits under 35 U.S.C. § 119(a)-(d) to German patent application number DE 10 2021 108 126.2, filed Mar. 31, 2021, which is incorporated by reference in its entirety.

TECHNICAL FIELD

The present disclosure relates to a deep-drawing packaging machine. Furthermore, the present disclosure relates to a method for closing packaging trays.

BACKGROUND

Tubular bag machines and chamber belt machines that use an impulse sealing bar to produce a sealing seam to close an open side of the packaging supplied already exist. Such an impulse sealing bar is known, for example, from EP 2 505 340 A1.

DE 198 15 763 C2 discloses an impulse sealing bar comprising a heating strip that can be energized. Thermal insulation is provided between a bar body and the heating strip. The impulse sealing bar is pressed firmly onto the films to be welded while the heating strip is supplied with a current impulse via an impulse generator and is thereby heated for welding the films together.

DE 197 37 471 C2 discloses an impulse heating device with a carrier made of metal on which onto electrically insulating layer is applied on which at least one thick-film conductor track is attached as a heating conductor. To energize the impulse heating device, the electrical resistance of the heating conductor, which varies as a function of the present heating conductor temperature, is measured and used as a control variable for the energization.

DE 10 2012 007 594 B1 and DE 10 2012 007 598 A1 disclose a packaging machine with a pre-sealing station for producing a pre-sealing seam and a main sealing station disposed in the direction of production downstream for producing a main sealing seam, where the pre-sealing seam together with the main sealing seam produce a closed sealing seam on a finished packaging.

With a conventional continuously heated sealing tool, the sealing seams are frequently still warm and cannot be mechanically stressed once the sealing tool is opened. This occurs mainly with mono-material films such as PE or HDPE. The weight of the product affects the sealing seams that are still warm and dimensionally unstable and influences the sealing seam quality in a negative way. This can even lead to the packaging no longer having the desired barrier properties.

SUMMARY

An object of the disclosure is to provide a deep-drawing packaging machine which improves the sealing process both economically and in terms of quality. In addition, a corresponding method at a deep-drawing packaging machine is to be provided.

This object is satisfied by a deep-drawing packaging machine according to the disclosure. This object is further more satisfied by a method at a deep-drawing packaging machine according to the disclosure.

The deep-drawing packaging machine according to the disclosure comprises in the direction of production a forming station for producing trays in a film web, a loading stretch for filling the trays with a product, a sealing device for sealing the trays with a top film, as well as a cutting device for separating finished packagings. The sealing device comprises a first sealing tool for a first sealing cycle and a second sealing tool for a second sealing cycle.

According to the disclosure, the first sealing tool comprises at least one first pair of impulse sealing bars oriented in a first orientation relative to the direction of production for producing first sealing seam sections, and the second sealing tool comprises at least one second pair of impulse sealing bars oriented in a second orientation relative to the direction of production for producing second sealing seam sections. The impulse sealing bars can be integrated in a compact configuration within the sealing station of the deep-drawing packaging machine. The main advantage of the impulse sealing bars for the sealing process is that they can alternately be heated up and cooled down quickly so that they can be controlled in an energy-efficient manner to produce the sealing seams. This property can be easily integrated into the intermittent mode of operation of the deep-drawing packaging machine. In addition, due to the ability of the impulse sealing bars to cool down quickly, they are predestined for the formation of very thin and delicate sealing seams.

Unlike conventional sealing tools, the impulse sealing bars used in the disclosure do not need to be heated continuously. The impulse sealing bars according to the disclosure are supplied with a current impulse for a fraction of a second for the respective sealing cycles and thus heated to a desired sealing temperature. By interrupting the energization, the impulse sealing bars can quickly cool down to a desired temperature level. This intermittent energization of the impulse sealing bars enables an energy-efficient sealing process. The use of impulse sealing bars provides the advantage of gentle material sealing with mechanically resilient sealing seams immediately after the sealing process, in particular when packaging delicate products, for example, when packaging medical products.

The separate provision of impulse sealing bars in pairs at the deep-drawing packaging machine according to the disclosure enables sealing forces and sealing times, for example, for the production of longitudinal and transverse sealing seams, to be distributed to different sealing work cycles in such a way that closed sealing seams thus produced can be produced more precisely. The provision of separate pairs of impulse sealing bars for different sealing cycles enables better distribution of load absorption along the sealing device and thereby gentle film welding, which overall leads to very high-quality sealing seam production.

One of the impulse sealing bars used according to the disclosure is preferably a sealing bar with a heating conductor which can be heated by resistance heating and which can be cyclically heated to a desired sealing temperature by a current impulse applied thereto for a fraction of a second or for a few seconds. The current impulse can be generated by an impulse generator.

According to one embodiment, the respective impulse sealing bars comprise at least one electrical heating conductor which can be configured, for example, as a heating strip or as a heating wire. The heating conductor can be pressed onto the films to be welded during the sealing process. Due to its electrical resistance, the heating conductor can be heated to a predetermined sealing temperature by a current impulse applied thereto in every sealing cycle during operation of the sealing device. Between the current impulses, i.e., during respective interruptions of the power supply to the heating conductor, the heating conductor cools down to a temperature level until another current impulse arrives thereat in the subsequent sealing cycle, whereby the heating conductor heats up again to the sealing temperature level.

The respective impulse sealing bars preferably comprise a bar body and an insulating layer arranged between the bar body and the heating conductor. The insulating layer can at least largely prevent the thermal energy generated at the heating conductor from being transferred to other components of the impulse sealing bars, for example, to the bar body, which could potentially reduce the sealing performance of the heating conductor.

For the first sealing tool and for the second sealing tool, a variant provides that the sealing device comprises at least one impulse generator each which is configured to generate current impulses for the respective sealing cycles during operation of the sealing device in order to thereby heat the respective heating conductors of the impulse sealing bars of the two sealing tools. In one variant, two identically configured sealing bars can be controlled in parallel with an impulse generator.

The first sealing tool and the second sealing tool are preferably configured in the direction of production one behind the other, separately, or as an integral unit. A separate configuration of the first and the second sealing tool would have the advantage that they can be moved and/or actuated independently of one another. This possibly favors a sensor-controlled operation of the deep-drawing packaging machine for the reason that the respective work cycles carried out thereat can be better coordinated with one another. The integral variant of the first and the second sealing tool provides particular advantages for a compact configuration.

According to one variant, the first sealing tool and the second sealing tool can perform sealing steps that are separate in time and place. The sealing seams produced in this manner together result in a closed sealing seam on the respective packagings. In this way, the respective sealing seams of individual packagings can be produced step by step along the deep-drawing packaging machine so that the sealing forces required to produce the respective sealing seams can be distributed over several stations along the deep-drawing packaging machine. This also favors gentle welding of the packaging films, which is particularly advantageous when packaging delicate products using delicate monofilms, for example, when packaging medical products.

For producing a closed sealing seam, one embodiment provides that the first sealing tool is configured to produce oppositely disposed first sealing seam sections on the respective packagings during the first sealing cycle by way of the first pair of impulse sealing bars, and the second sealing tool is configured to produce oppositely disposed second sealing seam sections on the respective packagings by way of the second pair of impulse sealing bars during the second sealing cycle following the first one. In this way, the production of the respective oppositely disposed sealing seams on a respective packaging can be carried out in subsequent sealing cycles, in particular at sealing stations arranged in the direction of production one behind the other.

The first pair of impulse sealing bars is preferably oriented transverse to the direction of production and the second pair of impulse sealing bars in the direction of production. Sealing seams can then be produced multiple times and in different orientations by use of the first and the second sealing tool. With the present variant, sealing seams can be produced in stages in the direction of production as well as sealing seams orthogonal to the direction of production.

It is conceivable to have the first pair of impulse sealing bars and the second pair of impulse sealing bars be dimensioned such that at least the respective ends of the first and the second sealing seam sections produced with the former overlap. It can thus be ensured that the respective first and second sealing seam sections together produce a closed seal of the packaging films on the respective packagings along their border. It would be conceivable in this context to have the first pair of impulse sealing bars and the second pair of impulse sealing bars be dimensioned such that the first and the second sealing seam sections produced with the former extend at least in sections beyond their converging ends, whereby the film web can be connected to the top film outside the respectively produced packagings for improved onward transportation and/or for removal.

The first pair of impulse sealing bars is preferably configured to simultaneously produce the first sealing seam sections on a packaging and/or on adjacent packagings during the first sealing cycle. What is then achieved is that the first sealing tool with the impulse sealing bars formed thereon can produce one or even several parallel sealing seams simultaneously on a packaging. Above all, this provides advantages for a deep-drawing packaging machine that is used for a multi-lane manufacturing process.

One advantageous configuration provides that the second pair of impulse sealing bars is configured to simultaneously produce the second sealing seam sections on a packaging and/or on adjacent packagings during the second sealing cycle. What is then achieved is that the second sealing tool with the impulse sealing bars formed thereon can produce one or even several parallel sealing seams simultaneously on a packaging. Above all, this provides advantages for a deep-drawing packaging machine that is used for a multi-lane manufacturing process.

The first pair of impulse sealing bars and/or the second pair of impulse sealing bars are preferably configured to produce linear, possibly slightly curved, or wavy first and/or second sealing seam sections. The linear sealing seams thus produced in the first and the second sealing cycle can together result in a closed sealing seam on a packaging. The result of sealing seams assembled in this manner is impeccable visually and in terms of quality. The respective impulse sealing bars can be present in the form of linear sealing strips, in particular formed to be rod-shaped.

It is possible to carry out an evacuation and/or gas flushing process at the deep-drawing packaging machine in order to generate a desired atmosphere within the packaging produced. For this purpose, it would be advantageous if, during the first sealing cycle, all sealing seams are produced oriented transverse to the direction of production. This could then be followed by an evacuation process and/or gas-flushing process via unsealed edge regions of the packaging using a desired protective gas. Following such an exchange of atmosphere, all of the sealing seams oriented in the direction of production can be produced during the second sealing cycle.

It is possible for the respective impulse sealing bars to have contact tips at their ends for heating and/or supply lines. These contact tips can be an interference contour for the sealing process, as they penetrate the sealing plane when the respective impulse sealing bars are pressed against the film material and thereby additionally stress the packaging films. Against this background, it is conceivable that the film web and/or the top film provides prefabricated moldings for the contact tips. Such moldings could alternatively be produced into the film web and/or top film along the deep-drawing packaging machine prior to the sealing process for accommodating the contact tips of the impulse sealing bars during the sealing process.

It would be possible, for example, to have the forming station for producing the trays also be configured to produce such moldings and/or a separate forming station be arranged at the deep-drawing packaging machine for this purpose. The moldings are located in particular outside of the packaging to be produced, e.g., in the region of the waste strips (e.g., along an edge or center strip). It is conceivable that the moldings are cut and/or punched out at least in part.

The respective impulse sealing bars are preferably connected to a liquid cooling system of the deep-drawing packaging machine. The liquid cooling can be used as a central unit for cooling several work stations of the deep-drawing packaging machine for continuously and/or temporarily cooling tools employed there during the packaging process, for example, the two sealing tools. It is conceivable that the liquid cooling is formed at least in sections in a receptacle of the first and/or the second sealing tool.

The respective impulse sealing bars are preferably each fastened by way of a locating and non-locating bearing arrangement. In this way, thermal expansion of the impulse sealing bars during the heating process can be compensated for. In other words, this can prevent mechanical stresses from developing in the impulse sealing bars.

For a removal of the edge or center strip of the remaining packaging material in a stable process, it can be useful to connect the film web to the top film at least in sections in these regions. Partial sealing of these regions can already take place with the transverse sealing during the first sealing cycle in that corresponding transverse sealing seams are continued into the edge or central strip. For an extended seal in the direction of production, an additional possibly permanently heated sealing tool can be used since the requirements of such transfer sealing seams are low. For example, a separate sealing station which connects the packaging films at the deep-drawing packaging machine in the direction of production downstream of the second sealing tool at points or in sections for improved onward transport would be conceivable This allows the sealed packagings to be supplied very precisely to the downstream cutting devices.

The disclosure furthermore relates to a method for a deep-drawing packaging machine for sealing trays formed into a film web with an top film, where the trays are supplied in the direction of production to a sealing device which comprises a first sealing tool for a first sealing cycle and a downstream second sealing tool for a later second sealing cycle. According to the disclosure, the first sealing tool employs at least one first pair of impulse sealing bars oriented in a first orientation relative to the direction of production for producing first sealing seam sections, and the second sealing tool at least one second pair of impulse sealing bars oriented in a second orientation relative to the direction of production for producing second sealing seam sections.

The production of the respective sealing seams for the packagings produced along the deep-drawing packaging machine can be divided by way of the two pairs of impulse sealing bars to a first and a second sealing cycle whereby the sealing forces required for producing the sealing seams can also be distributed to the respective sealing cycles so that overall qualitatively improved sealing seams can be produced using the two pairs of impulse sealing bars. The use of the impulse sealing bars for sealing individual packages is energy-efficient and can be carried out in a compact manner at the deep-drawing packaging machine.

For producing a closed sealing seam, one advantageous configuration provides that the first sealing tool produces oppositely disposed first sealing seam sections on the respective packagings during the first sealing cycle by way of the first pair of impulse sealing bars, and the second sealing tool produces oppositely disposed second sealing seam sections on the respective packagings during the second sealing cycle by way of the second pair of impulse sealing bars. This means that the first sealing cycle is present as a pre-sealing cycle and the second sealing cycle as the main sealing cycle for producing closed sealing seams on the respective packagings. This leads to the fact that the required sealing forces can be optimally distributed over the packaging material using the impulse sealing bars that are paired according to the disclosure and that are used one after the other during the packaging process.

BRIEF DESCRIPTION OF THE DRAWINGS

In the following, an advantageous embodiment of the disclosure shall be illustrated in detail using drawings, where in detail.

Same components are provided with the same reference numerals throughout the figures.

DETAILED DESCRIPTION

Figure 1:
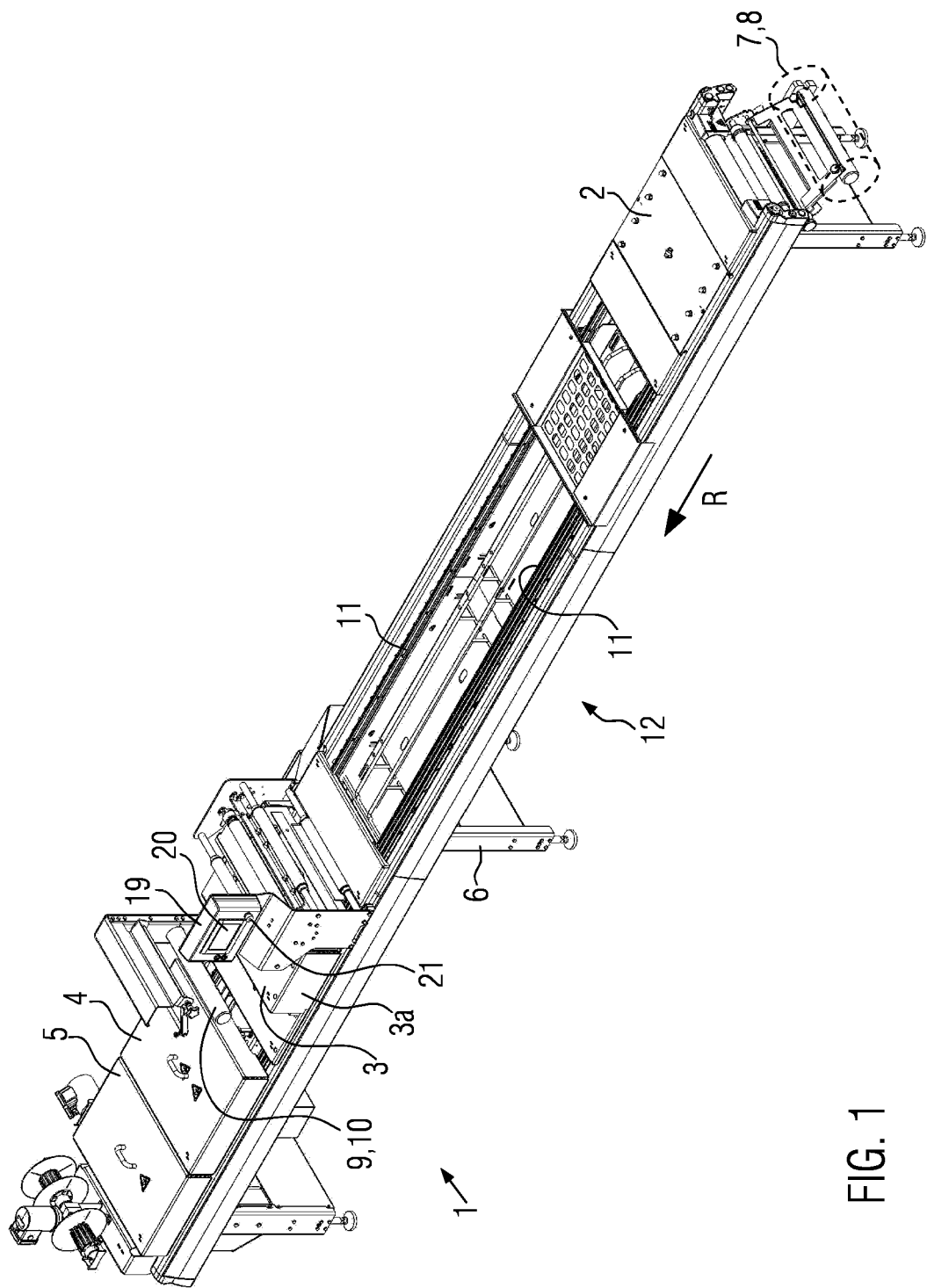
FIG. 1 shows a perspective view of a deep-drawing packaging machine according to the disclosure.

FIG. 1 shows an intermittently operating deep-drawing packaging machine 1 according to the disclosure in a perspective representation. Deep-drawing packaging machine 1 comprises a forming station 2, a sealing station 3, a transverse cutting station 4, and a longitudinal cutting device 5 which are arranged in this sequence in a direction of production R on a machine frame 6. On the inlet side, a supply roll 7 from which a film 8 is drawn off is disposed on machine frame 6. Furthermore, deep-drawing packaging machine 1 comprises a transport chain 11, which grips film 8 web and transports it onward in direction of transport R, in particular transport chains or clamp chains 11 arranged on both sides.

In the embodiment shown, forming station 2 is configured as a deep-drawing station in which trays M (see FIG. 2) are formed into base film 8 by deep-drawing, for example, by use of compressed air and/or a vacuum. Forming station 2 can be configured such that several trays M can be formed next to one another in the direction perpendicular to direction of production R. In direction of production R downstream of forming station 2, a loading stretch 12 is provided in which trays M formed into film web 8 are filled with products.

Sealing station 3 comprises a hermetically sealable chamber 3*a* in which the atmosphere in trays M can be evacuated and/or replaced by gas flushing with an exchange gas or with a gas mixture prior to the production of closed sealing seams with top film 10 that is dispensed from a top film receptacle 9.

Transverse cutting device 4 is configured as a punch that severs film web 8 and top film 10 between adjacent trays M in a direction transverse to direction of production R. Transverse cutting device 4 operates in such a manner that film web 8 is not cut open across the entire width, but is not severed at least in an edge region. This enables controlled onward transportation by transport chain 11.

Longitudinal cutting device 5 can be configured as a knife assembly with which film web 8 and top film 10 are severed between adjacent trays M and at the lateral edge of film web 8 in direction of transport R so that individual packagings are present downstream of longitudinal cutting device 5.

Deep-drawing packaging machine 1 furthermore comprises a control device 19. Its task is to control and monitor the processes running in deep-drawing packaging machine 1. A display device 20 with control elements 21 is used for the visualization or influence of the process sequences in deep-drawing packaging machine 1 to or by an operator.

Figure 2:
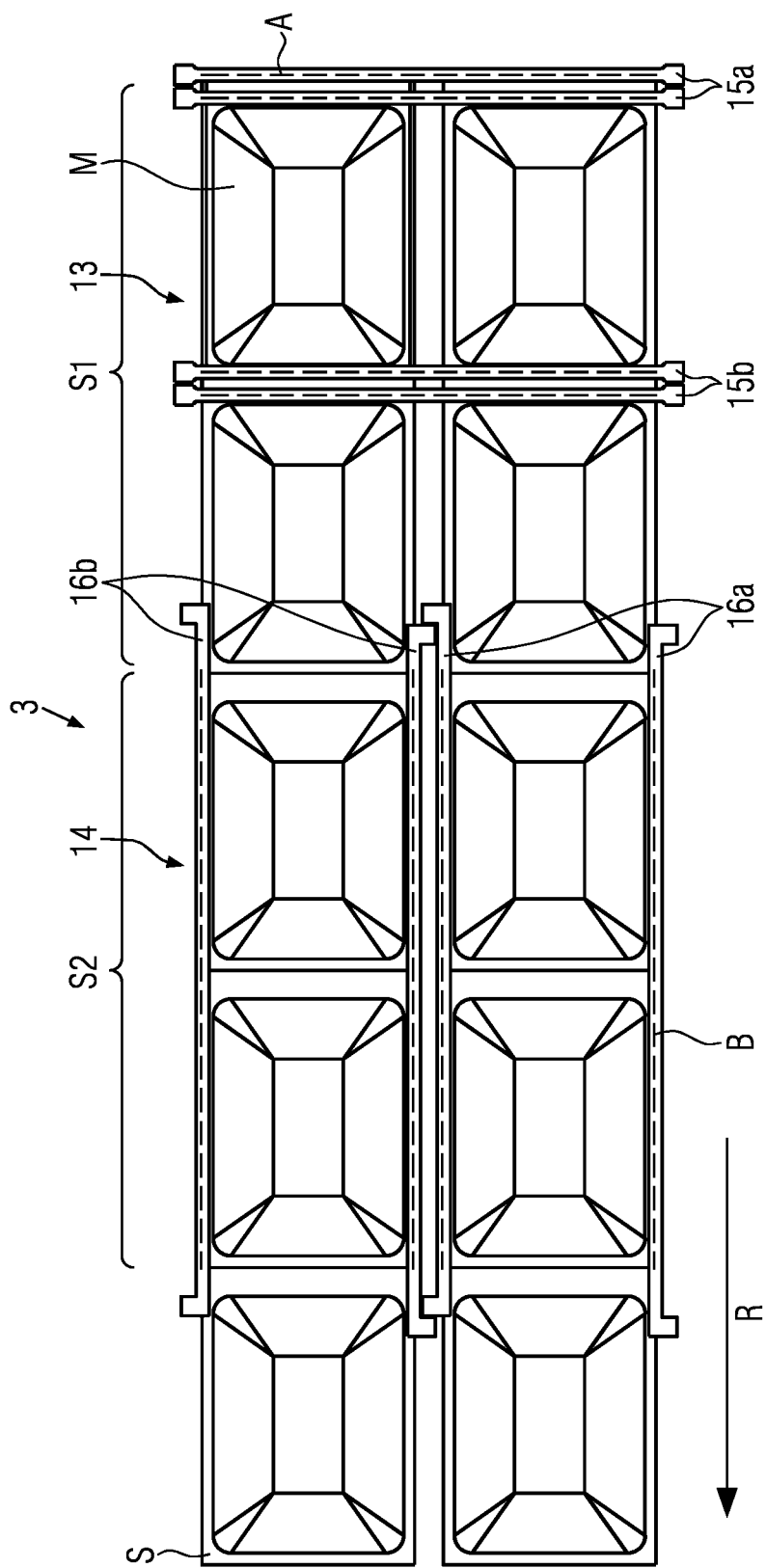
FIG. 2 shows a schematic representation of a sealing device according to the disclosure with paired impulse sealing bars.

FIG. 2 shows a schematic representation of sealing device 3 with a first sealing tool 13 and a second sealing tool 14 which are arranged one behind the other in this sequence in direction of production R at deep-drawing packaging machine 1. First sealing tool 13 is employed during a first sealing cycle S1 and second sealing tool 14 during a second sealing cycle S2. First sealing tool 13 comprises a first pair of impulse sealing bars 15a, 15b oriented transverse relative to direction of production R for producing first sealing seam sections A, which in FIG. 2 are produced as transverse sealing seams with regard to direction of production R. Furthermore, FIG. 2 shows that second sealing tool 14 comprises a second pair of impulse sealing bars 16a, 16b oriented in direction of production R for producing second sealing seam sections B. First and second sealing seam sections A, B together can produce a closed sealing seam S on a respective finished packaging.

In FIG. 2, respective impulse sealing bars 15a, 15b each comprise two impulse sealing bars in parallel close to one another. Impulse sealing bar 15a according to FIG. 2 is therefore configured for the simultaneous production of adjacent sealing seam sections A on adjacent trays M. This also applies analogously to impulse sealing bar 15b of first sealing tool 13. Impulse sealing bars 16a, 16b in direction of production R arranged downstream produce the longitudinal sealing seams on the respective packagings in direction of production R. The impulse sealing bars 15a, 15b, 16a, 16b may be configured to be movable in a vertical direction. In operation, the sealing bars 15a, 15b, 16a, 16b may be lowered onto the trays M, and seal the film web 8 and the top film 10 by a suitable application of heat and pressure.

Second pair of impulse sealing bars 16a, 16b comprise a total of four impulse sealing strips which are arranged in parallel in direction of production R and are configured to produce second sealing seam sections B along direction of production R.

What is claimed is:

1. A deep-drawing packaging machine comprising, in a direction of production, a forming station for producing trays in a film web, a loading stretch for filling the trays with a product, a sealing device for sealing the trays with a top film, and a cutting device for separating finished packagings, wherein the sealing device comprises a first sealing tool for a first sealing cycle and a second sealing tool for a second sealing cycle, wherein the first sealing tool comprises a first pair of impulse sealing bars oriented in a first orientation relative to the direction of production for producing first sealing seam sections, and the second sealing tool comprises a second pair of impulse sealing bars oriented in a second orientation relative to the direction of production for producing second sealing seam sections.

2. The deep-drawing packaging machine according to claim 1, wherein the first sealing tool and the second sealing tool are formed in the direction of production one behind the other, separately, or as an integral unit.

3. The deep-drawing packaging machine according to claim 1, wherein, for producing a closed sealing seam, the first sealing tool is configured to produce oppositely disposed first sealing seam sections on the respective packagings during the first sealing cycle by way of the first pair of impulse sealing bars, and the second sealing tool is configured to produce oppositely disposed second sealing seam sections on the respective packagings by way of the second pair of impulse sealing bars during the second sealing cycle following the first sealing cycle.

4. The deep-drawing packaging machine according to claim 1, wherein the first pair of impulse sealing bars is oriented transverse to the direction of production and the second pair of impulse sealing bars is oriented in the direction of production.

5. The deep-drawing packaging machine according to claim 1, wherein the first pair of impulse sealing bars and the second pair of impulse sealing bars are dimensioned such that at least respective ends of the first and the second sealing seam sections produced with the former overlap.

6. The deep-drawing packaging machine according claim 1, wherein the first pair of impulse sealing bars is configured to simultaneously produce the first sealing seam sections on a packaging and/or on adjacent packagings during the first sealing cycle.

7. The deep-drawing packaging machine according to claim 1, wherein the second pair of impulse sealing bars is configured to simultaneously produce the second sealing seam sections on a packaging and/or on adjacent packagings during the second sealing cycle.

8. The deep-drawing packaging machine according to claim 1, wherein the first pair of impulse sealing bars and/or the second pair of impulse sealing bars are configured to produce linear first and/or second sealing seam sections.

9. A method for a deep-drawing packaging machine for sealing trays formed into a film web with a top film, wherein the trays are supplied in a direction of production to a sealing device which comprises a first sealing tool for a first sealing cycle and a downstream second sealing tool for a later second sealing cycle, wherein the first sealing tool uses at least one first pair of impulse sealing bars oriented in a first orientation relative to the direction of production for producing first sealing seam sections, and the second sealing tool uses at least one second pair of impulse sealing bars oriented in a second orientation relative to the direction of production for producing second sealing seam sections.

10. The method according to claim 9, wherein, for producing a closed sealing seam, the first sealing tool produces oppositely disposed first sealing seam sections on respective packagings during the first sealing cycle by way of the at least one first pair of impulse sealing bars, and the second sealing tool produces oppositely disposed second sealing seam sections on the respective packagings during the second sealing cycle by way of the at least one second pair of impulse sealing bars.

* * * * *